March 11, 1930.  N. L. OLSON  1,750,424
MOLDING APPARATUS
Filed Nov. 4, 1927  2 Sheets-Sheet 2
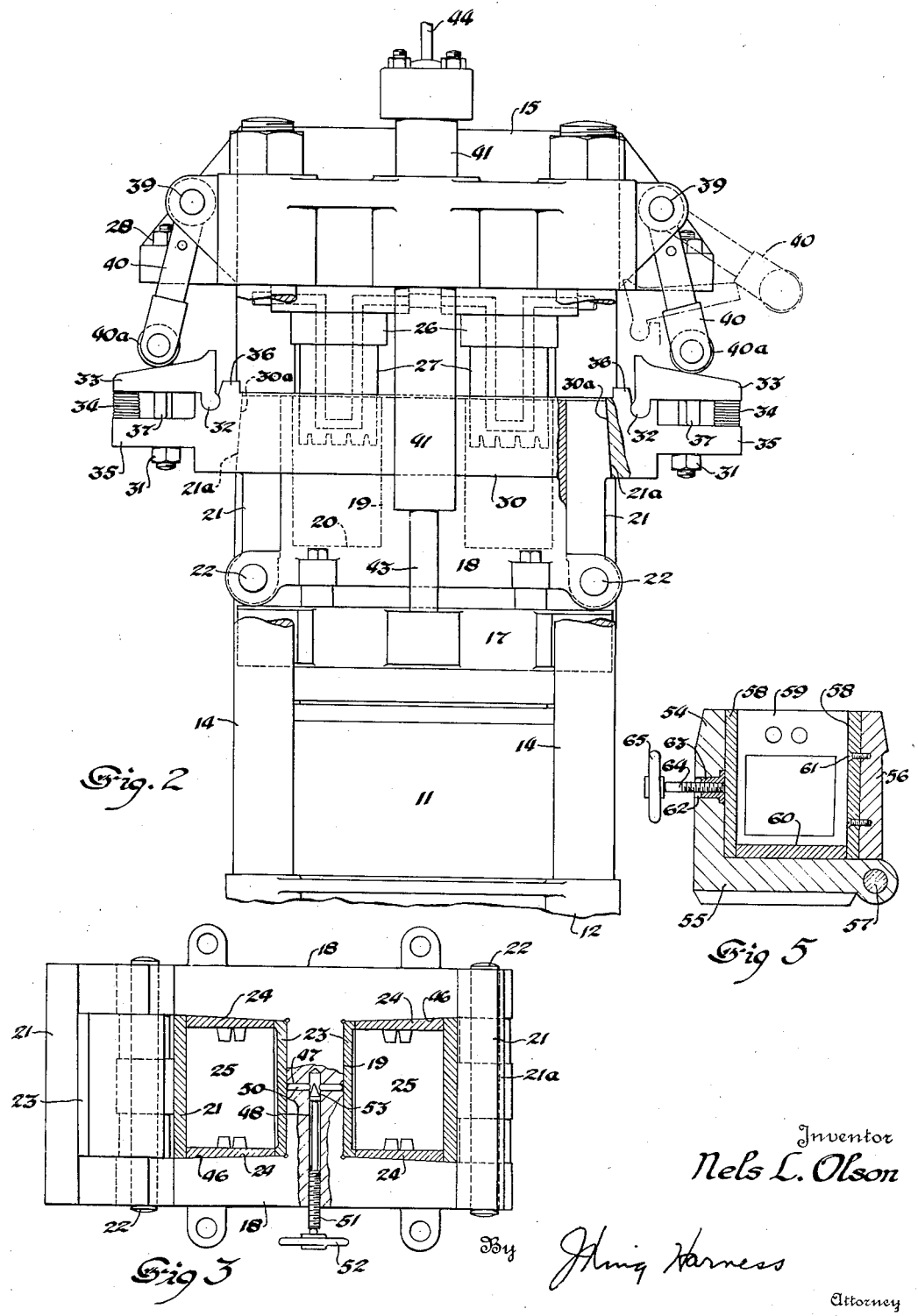

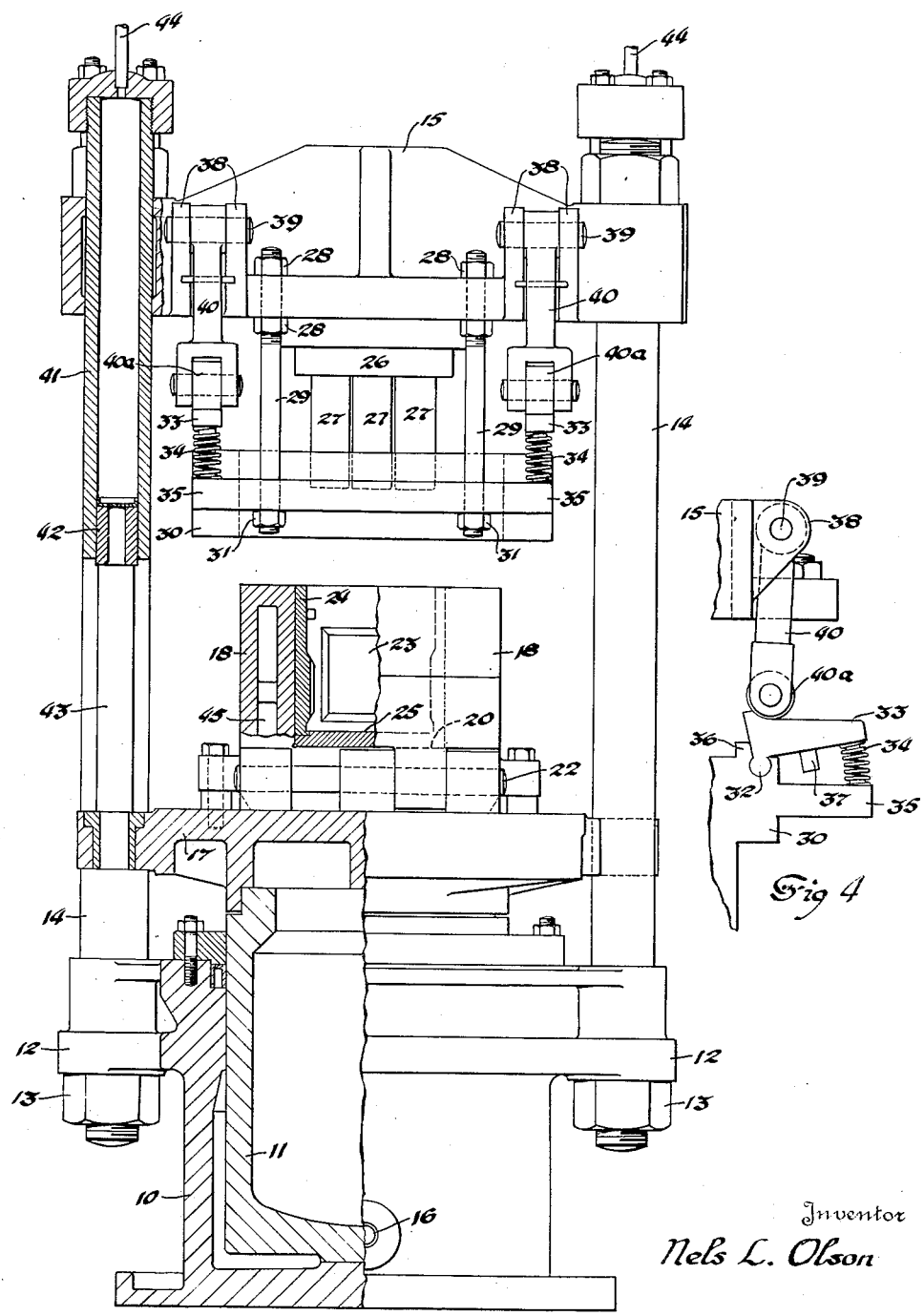

Patented Mar. 11, 1930

1,750,424

UNITED STATES PATENT OFFICE

NELS L. OLSON, OF HIGHLAND PARK, MICHIGAN, ASSIGNOR TO AMERICAN RUBBER PRODUCTS CORPORATION, A CORPORATION OF MICHIGAN

MOLDING APPARATUS

Application filed November 4, 1927. Serial No. 230,979.

This invention relates to molding machines and particularly to those types adapted for use in the manufacture of battery boxes or similarly shaped objects, the principal object being the provision of a new and novel construction for the same.

Another object is to provide a machine of the type described wherein the molding operation is accomplished by hydraulic power means, a mold being employed having a removable side wall, and an automatically actuated device being provided for locking the side wall against movement during the operation of molding.

A further object is to provide a device for molding battery boxes and the like of rubber, asphaltum or other material, comprising a hydraulic press provided with a mold carried by the ram thereof, the mold being provided with a removable face to permit removal of the finished product, and the head being provided with the usual core member, a member supported from the head and movable relative to both the mold and the core being provided for locking the movable side wall of the mold against movement during the molding operation, suitable means being provided for forcing this member into position with respect to the mold upon operation of the press, and other means being provided for disengaging this member from the mold upon reverse movement of the press.

The above being among the objects of the present invention, the same consists in certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views, Fig. 1 is a side elevation of a hydraulic press provided with the molding apparatus constructed in accordance with the present invention, the mold and core being shown in separated position.

Fig. 2 is a fragmentary side elevation of the upper end of the press shown in Fig. 1 turned 90 degrees from the view in Fig. 1, certain parts being broken away to better illustrate the same.

Fig. 3 is a sectional view taken on line 3—3 of Fig. 2.

Fig. 4 is a fragmentary view showing the manner in which the fingers on the press head coact with the cam members carried by the locking ring upon first engagement therewith.

Fig. 5 is a vertical sectional view taken centrally through a mold of the single type, showing a preferred form of stripping device used in connection therewith.

The present invention deals with means for forming battery boxes and the like of rubber or like substances and is particularly designed for the cold pressing of a material having an asphalt base into a box such as is employed for receiving the elements of storage batteries. In work of this type it is necessary to use an enormous pressure to properly form the finished product, and the use of this enormous pressure sets up problems which heretofore caused many difficulties. One of the difficulties is encountered because of the fact that the molds used in such operations invariably are provided with one or more movable walls which must be held in position during the molding operation and resist the pressure to which the material within the same is subjected. I have found that in the past such devices have allowed such movable walls to give, thereby causing the side of the box adjacent such wall to be of greater thickness than the rest of the walls and causing like irregularities in other parts of the finished product. By the use of the present invention I provide a mold which has but one movable wall for each box, and provide means for positively locking such wall against movement under the enormous pressure to which it is subjected, thus resulting in a finished product of uniform section throughout.

In accordance with the present invention I show in the accompanying drawings a hydraulic press comprising the usual cylinder base 10 in which is slidably received a conventional ram 11. Secured to the flanges 12 of the base 10 by the nuts 13 and extending upwardly therefrom are the four posts or pillars 14 to the upper end of which is secured the usual head 15. Fluid under pressure may be introduced into the interior of the base 10 through the opening 16 in order that the same may act on the bottom of the ram 11 and cause the same to move vertically upwardly in order to perform a pressing or other function. The head of the ram 11 is provided with the usual table 17 to the upper surface of which is secured a mold comprising side walls 18, an intermediate wall 19, bottom wall 20 and end walls 21, the mold being formed to simultaneously form two boxes. The walls 18, 19 and 20 are formed integral with each other, and the end walls 21 are pivotally secured thereto by a hinged joint including the pins 22 so that they may be swung outwardly from the top and down about the pins 22 to disclose the interior recesses of the mold and are formed with the upper portion of their outer faces tapered inwardly at a relatively small angle as at 21ª, such angle being preferably small enough to form a self-locking joint upon engagement of such tapered portion with a like angular surface. Removable plates such as 23, 24 and 25 having formed thereon decorative or useful impressions for the outer faces of the boxes are positioned within the mold against the walls thereof, the corresponding plate for the wall 21 being secured directly to the wall 21 and being movable therewith. Secured to the head 15 of the press is a core comprising a base 26 and downwardly projecting spaced members 27 which are adapted to be received within the interior of the mold and thus form the pockets or depressions in the finished product which receive the battery elements. Secured to the head 15 by the nuts 28 and projecting downwardly therefrom are the rods 29 which extend to a point spaced above the top of the mold when in lowered position, and slidably received thereon is the frame, ring or clamping member 30 which is limited in its downward movement thereon by the nuts 31 secured to the lower end of the rods 29. The clamping member 30 is formed with an opening in its center for receiving the mold therein, the end faces of this opening being tapered as at 30ª to coact with the portions 21ª of the doors 21. Pivotally supported on the frame 30 at 32 are four cam members 33. A coil spring 34 is normally held under partial compression between the outer end of the cam members 33 and the flange 35 on the frame 30, the springs 34 tending to raise the outer ends of the cam members 33 as indicated in Fig. 4. A suitable stop such as 36 is provided on the frame 30 for limiting the upward swinging movement of the cam members 33. A suitable boss 37 is provided on the lower face of each cam member 33 for engagement with the flange 35 in order to limit the swinging movement of the cam members 33 in the opposite direction.

Pivotally secured by the pins 39 between each of the split bosses 38 formed on the head 15 in vertical alignment with the cam members 33 is a swinging lever member or finger 40 provided with a roller 40ª at its lower end which is adapted to engage the upper surface of the corresponding cam member 33 in the operation of the machine, as will be presently described. A pair of vertically extending elongated cylinders 41 are rigidly connected to the table 17 by the rods 43. Means such as the pipes 44 are employed for introducing fluid under pressure into the cylinders 41 for the purpose of forcing the table 17 to resume its normal inoperative position and to withdraw the mold from engagement with the core upon completion of a pressing operation.

Inasmuch as the enormous pressure employed in the device may tend to lock the plates 23, 24 and 25 in place and make their removal with the molded article difficult, I prefer to taper the sides of the mold as at 46 in Fig. 3, and taper the side plates 24 in conformity therewith so that slight movement of the plates outwardly of the mold will relieve any binding pressure between the plates 24 and the walls of the mold and will thereafter allow their ready removal. In order to obtain the initial movement of the plates in order to relieve such binding pressure I provide an opening 47 extending through the wall 19 centrally of the back plates 23, and an opening 48 perpendicular to the opening 47 and intersecting the same, the opening 48 leading out through a side wall of the mold. A pair of sliding members 50 are placed in the opening 47 and a member 51 provided, with a hand wheel 52 is threadably received in the opening 48. The member 51 is provided with a conical end 53 which is adapted to enter between the members 50 and force them apart when the member 51 is threaded inwardly. When the members 50 are forced apart they bear against the plates 23 and force them outwardly, and as the plates 24 and 25 are overlapped by the plates 23 they are forced outwardly therewith. By this means sufficient movement is imparted to the plates 24 to relieve any binding force that may exist between them and the sides of the mold.

A similar but simpler device may be employed where a mold is used for molding but one box at a time as shown in Fig. 5. The mold itself may be of substantially the same construction as the double mold previously described, it having a back wall 54, bottom wall 55, and front wall or door 56 corresponding to the walls 19, 20, and 21, respectively, the front wall 56 being pivotally connected to the bottom wall 55 by a pin 57 corresponding to the pins 22. Liner plates 58, 59 and 60 corresponding to the plates 23, 24 and 25 respectively may be provided within the mold, the front plate 58 being secured to the door 56 by screws such as 61. In this case an opening 62 is provided through the back wall 54 and a nut member 63 is secured therein against axial movement. A screw member 64 having a hand wheel 65 is threadably received in the nut 63 and may be threaded inwardly against the back plate 58 and force it with the plates 59 and 60 outwardly from the mold.

In operation, a definite quantity of a substance to be molded is placed within each pocket of the mold, and the doors 21 are moved to closed position. Liquid under pressure is then introduced through the opening 16 into the interior of the cylinder 10 which causes the ram 11, head 17 and mold to move upwardly. When the mold reaches the frame 30 it is received within the same and the tapered inside end faces 30$^a$ of the frame 30 engage the tapered upper outer faces 21$^a$ of the doors 21. As the ram 11 continues to rise the mold tends to raise the frame 30 therewith, this movement of the frame 30 being opposed by the swinging members 40 through the cam members 33. Continued upward movement of the frame 30 causes a pressure to be exerted through the members 40 to the cam members 33 which tend to pivot about the points 32 and compress the springs 34, and the resistance to such compression tends to drive the frame 30 into closer relationship with respect to the doors 21, thus forcing the doors 21 against the sides 18 of the mold and locking them securely in such position. As the frame 30 continues to rise the cam members 33 pivot about their pivot points 32 and the springs 34 continue to be compressed, the angle of the upper faces of the cam members 33 changing with respect to the axis of the members 49 until the angle becomes such that the lower ends of the members 40 move outwardly over the face of the cam members 33 and eventually slide off of the same as indicated in dotted lines in Fig. 2. While the ram 11, head 17 and mold thus move upwardly, the core members 27 move into the interior of the mold and force the moldable material therein to completely fill the space between the core members 27 and plates 23, 24 and 25 and puts such material under sufficient pressure to completely fill every available particle of such space and to impart to the same a hard and dense structure. When the ram 11 and cooperating parts have moved to their extreme upper limit and the molding operation has been completed, the pressure on the ram 11 is released and pressure is introduced through the pipe 44 into the cylinders 41 which, acting on the pistons 42, force the table 17, ram 11 and mold downwardly. In moving downwardly the mold carries the frame 30 with it until the frame 30 engages the nuts 31 which prohibit further downward movement of the frame 30 and thus separate the same from the mold. When the ram 11 has reached its lower most position the doors 21 are swung outwardly, and the molded article within the mold with the plates 23, 24 and 25 are removed, after which the plates 23, 24 and 25 may be readily separated from the molded article and replaced in the mold for the next operation.

Although the apparatus herein described is particularly adaptable for use in such types of machines where cold press work is employed, and consequently in which materially greater pressures are necessary than where hot press or vulcanizing processes are employed, it will be readily apparent that it may as well be used for the hot press processes and in such case the side walls of the mold may be provided with steam or other passages 45, and the core members 27 may likewise be heated as in conventional constructions.

From the foregoing it will be apparent that the device above described provides a construction in which the design of the mold and the ease with which it may be operated is materially simplified, and that the movable elements of the same are securely and positively locked against movement and against springing during the molding operation, and that the engagement and disengagement of the frame with the moveable elements of the mold is accomplished in a simple, effective and automatic manner.

Formal changes may be made in the specific embodiment of the invention described without departing from the spirit or substance of the broad invention, the scope of which is commensurate with the appended claims.

What I claim is:

1. In a device of the type described, the combination with a mold having a movable side wall, a core, said mold and core being movable relative to each other, a frame member movable relative to both said mold and core member engageable with said movable wall and the opposite side of said mold, the angle of contact between said frame member and said mold being less than the angle of friction of the material from which said mold or frame member is formed whereby said frame will lock itself to said mold upon engagement therewith, means for resiliently urging said frame member into contact with said mold, and means for rendering the first mentioned means inoperative after a predetermined movement of said frame member.

2. In a device of the type described, the combination with a mold having a movable side wall, a core, said mold and core being movable relative to each other, a frame member movable relative to both said mold and core member engageable with said movable wall and the opposite side of said mold, the angle of contact between said frame member and said mold being less than the angle of friction of the material from which said mold or frame member is formed whereby said frame will lock itself to said mold upon engagement therewith, and yieldable means operative only during an initial movement of said frame member for urging said frame member into close relationship in respect to said mold.

3. In a device of the type described, the combination with a mold having a movable side wall, a core, said mold and core being movable relative to each other, a frame member movable relative to both said mold and core member engageable with said movable wall and the opposite side of said mold, the angle of contact between said frame member and said mold being less than the angle of friction of the material from which said mold or frame member is formed whereby said frame will lock itself to said mold upon engagement therewith, and yieldable means for urging said frame member into close relationship in respect to said mold comprising a pair of pivoted members co-operating to resist movement of said frame member relative to said core member.

4. In a device of the type described, a stationary part and a part movable towards and from the same, a mold carried by one of said parts and a core carried by the other thereof, a frame member movable relative to both of said parts engageable with said mold to prevent spreading of the same, a pivoted member carried by said frame member, and a second pivoted member carried by said stationary part engageable with the first mentioned pivoted member, upon relative approach of said parts towards each other whereby to cause said frame to closely engage said mold.

5. In a device of the type described, a movable ram, a stationary head, a separable mold secured to said ram, a core secured to said head in alignment with said mold, a frame supported between said ram and said head and movable relative to both, said frame adapted to engage said mold during the work stroke of said ram whereby to prevent separation of said mold, a cam member pivotally mounted on said frame, spring means constantly urging said cam member to rotate in one direction, and a member pivotally secured to said head adapted to engage said cam member upon movement of said frame member toward said head whereby to turn said cam member and compress said spring and thereby resiliently urge said frame member into close relationship with said mold.

6. In a device of the type described, a movable ram, a stationary head, a separable mold secured to said ram, a core secured to said head in alignment with said mold, a frame supported between said ram and said head and movable relative to both, said frame adapted to engage said mold during the work stroke of said ram whereby to prevent separation of said mold, a cam member pivotally mounted on said frame, spring means constantly urging said cam member to rotate in one direction, a stop for limiting such rotative movement, and a member pivotally secured to said head adapted to temporarily engage said cam member upon movement of said frame member toward said head whereby to turn said cam member and compress said spring and thereby resiliently urge said frame member into close relationship with said mold.

7. A mold having all walls thereof fixed except one which is movable, the side walls adjacent said movable wall being spaced apart a greater distance at said movable wall than at the opposite side of said mold, plates received in said mold in contact with said walls, the plates contacting against said side walls tapering in section oppositely to the direction of taper of said side walls, and means for forcing said plates towards said movable wall, said means comprising a screw parallel with said plate opposite said movable wall and a pin perpendicular thereto and actuated thereby bearing against the rear face of the plate for the wall opposite to said moveable wall.

8. In a device of the type described, in combination, a mold provided with a pair of recesses having a common fixed wall, the wall of each of said recesses opposite said common wall being movable, the side walls of said recesses tapering outwardly toward their corresponding movable wall, liner plates loosely received within said recesses, said common wall being provided with an opening therethrough connecting said recesses, a pair of aligned pins in said opening, and a screw member threadably received in said common wall provided with a wedge end received between said pins.

NELS L. OLSON.